United States Patent Office 3,271,291
Patented Sept. 6, 1966

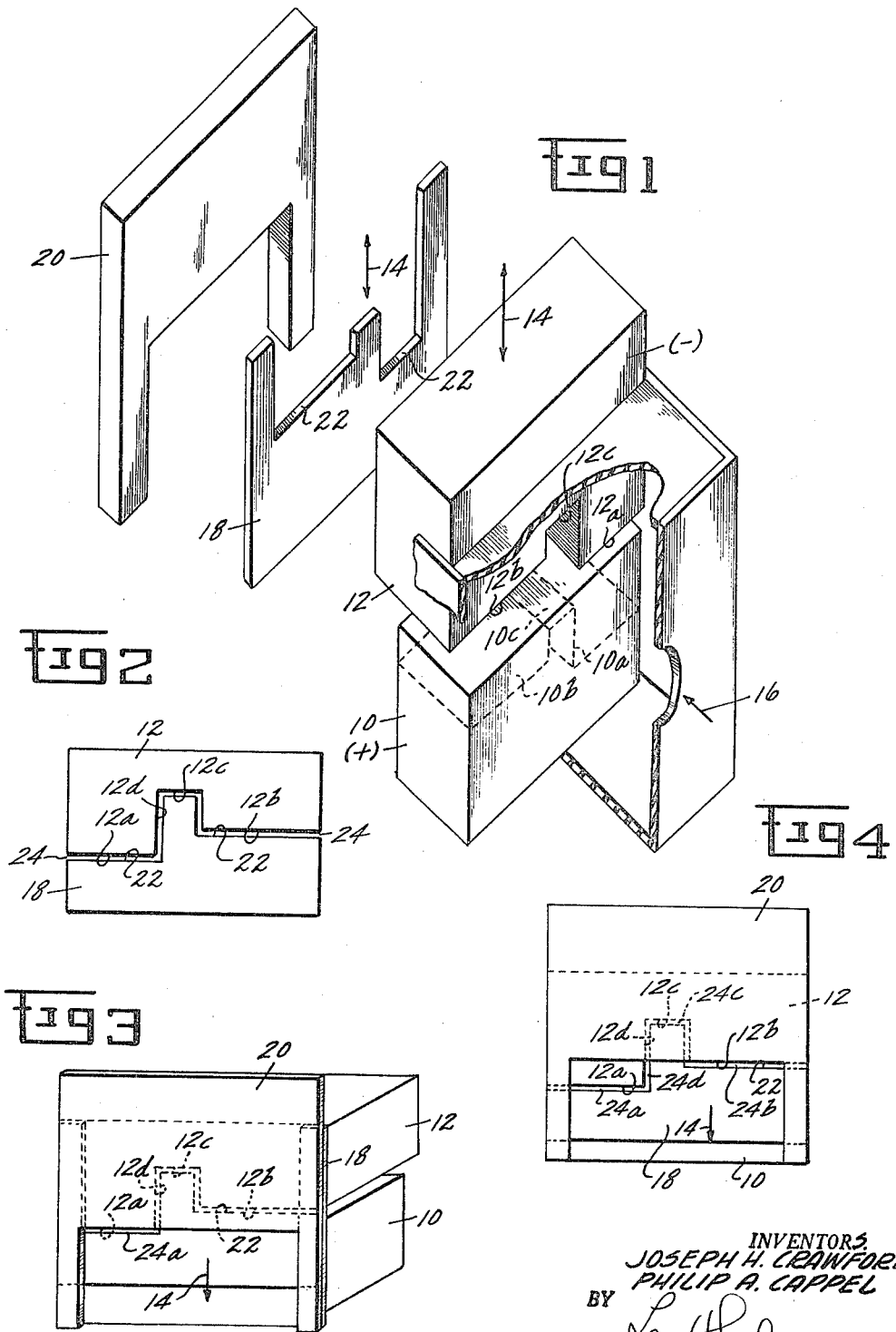

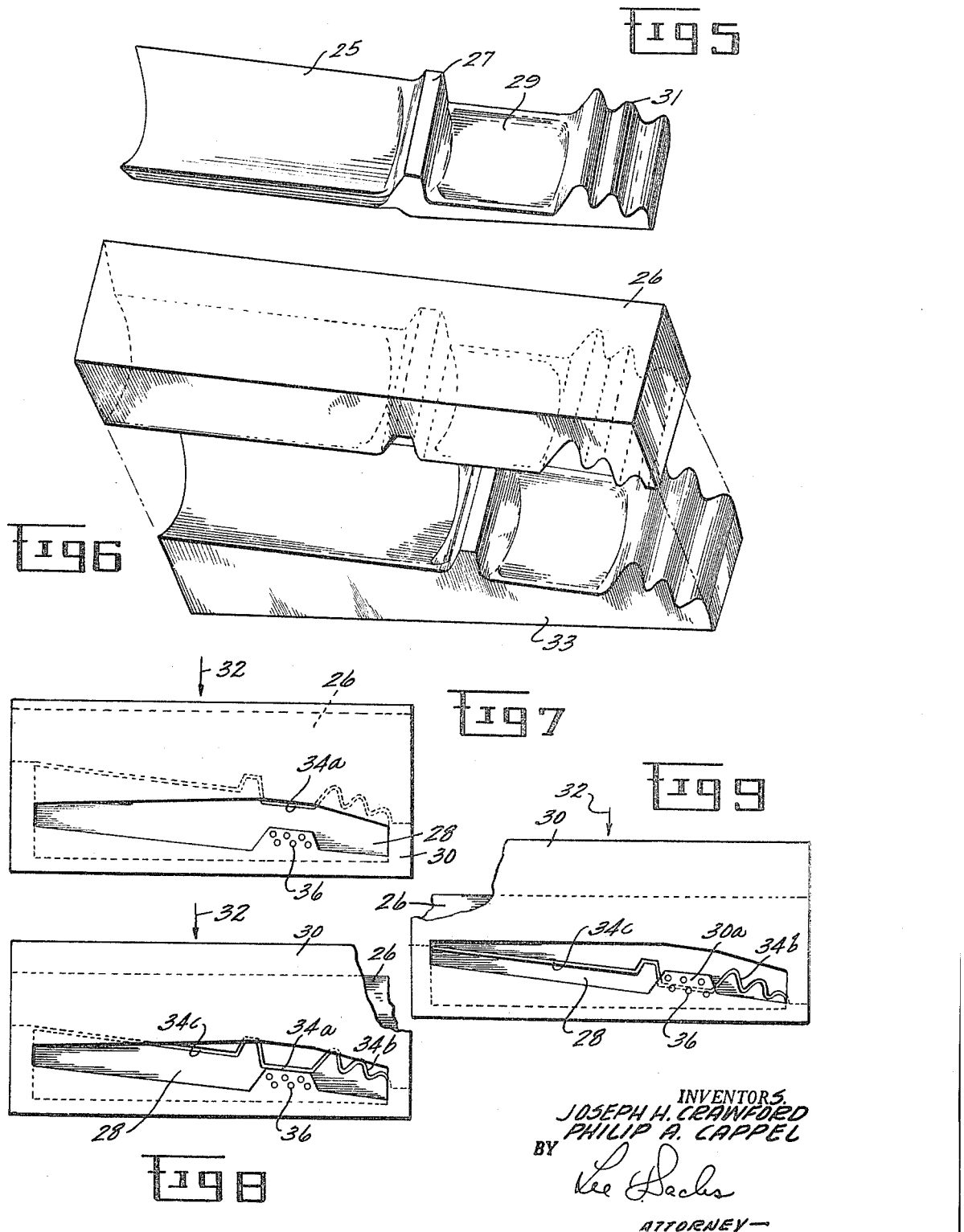

3,271,291
ELECTROCHEMICAL MACHINING APPARATUS WITH ELECTROLYTE FLOW CONTROL MEANS
Joseph Howard Crawford and Philip Allen Cappel, Cincinnati, Ohio, assignors to General Electric Company, a corporation of New York
Filed Dec. 3, 1962, Ser. No. 241,585
2 Claims. (Cl. 204—224)

This invention relates to electrochemical machining, particularly to directing the flow of electrolytes in electrochemical machining operations.

In its simplified form, electrochemical material removal, sometimes referred to as electrochemical machining, involves the location of an appropriately shaped tool, connected as a cathode, closely opposite an anode-workpiece. As an electrolyte is passed between the tool and workpiece and as electric current is impressed across such electrodes, a material removal or "deplating" action occurs at the anode. This type of process and various machines for accomplishing the general electrochemical machining process have been widely described in much detail in the literature.

The progress and ultimate shape of the anode-workpiece depends in part on the proximity and shape of the cathode and the rate at which the cathode and anode approach one another. If electrochemical material removal is to progress, care must be taken that a discharge or arcing does not occur between the cathode and the anode. Such arcing or short circuiting will terminate the electrochemical material removal action, not only at the point of the short circuit, but also for the entire cathode-tool. With proper apparatus safeguards the entire operation can be shut down before harm results. Without such safety equipment, the process equipment can be seriously damaged.

The character and rate of electrochemical material removal depends in part upon the flow of electrolyte between the two electrodes. If the face of the tool-cathode is irregularly shaped or contoured with respect to the opposing face of the workpiece, such as a face of a rectangular bar, as the cathode-tool and anode-workpiece approach one another to bring about electrochemical material removal, at least one part of the tool will be closer to a surface of the workpiece than will other parts of the tool. In passing between the tool and workpiece, the electrolyte has a tendency to seek the path of least resistance, namely, at the largest gap or spacing between the tool and the workpiece. Unfortunately, this is in the area where initially the least amount of electrochemical action is taking place due to such largest separation. As a result, electrolyte can stagnate or reaction product sludge can accumulate in the narrower passages between the tool and workpiece, stopping the material removal process. Arcing or short circuits then occur between the tool and workpiece at these highly conductive, congested areas.

A principal object of this invention is to reduce the required electrolyte capacity, and hence cost, of pumping facilities through more effective distribution of available electrolyte flow.

It is another object of the present invention to provide a method and apparatus for directing electrolyte flow during electrochemical material removal to assure adequate flow between all portions of a tool and a workpiece opposite one another in electrochemical material removal relationship.

Still another object is to provide an apparatus which continually adjusts the electrolyte exit between a tool and a workpiece during initial operation to provide adequate flow during electrolytic material removal.

A further object is to provide a method for controlling and directing the flow of electrolyte between a cathode and an anode during electrochemical material removal to inhibit stagnation of electrolyte and short circuiting between the two electrodes.

These and other objects and advantages will be more readily recognized from the following detailed description, examples and the drawing in which:

FIG. 1 is a partially schematic, isometric partially sectional expanded view of one form of the apparatus of the present invention in operating relationship;

FIG. 2 is an exit end view of a tool and weir;

FIG. 3 is an isometric exit end view of the apparatus at the start of operation;

FIG. 4 is an exit end view of the apparatus at a later point in the operation;

FIG. 5 is an isometric view of an article which can be made through the use of the invention;

FIG. 6 is an isometric view of a tool and partly finished workpiece developed in FIGS. 7, 8 and 9;

FIGS. 7, 8 and 9 are partially schematic exit end views of one form of the apparatus of the present invention in progressive steps of operation.

Briefly, the apparatus of the present invention is useful with a cathode-tool and an anode-workpiece in electrochemical material removal processes. In one form, it includes weir means and cooperating shutter means. The weir means includes a weir profile edge portion relating in shape to the tool profile portion where the electrolyte leaves the space between the tool and the workpiece. The shutter means, which is adjacent the weir means in operation, has a shutter edge portion forming one boundary of an opening in the shutter means. The weir means is spaced from a cooperating tool to provide a gap through which electrolyte can pass. The flow of electrolyte through such gap is controlled by the shutter means.

The method form of this invention for controlling the flow and utilization of electrolyte includes first directing the primary electrolyte flow to the smallest gap between the cathode-tool and anode-workpiece, and then directing the primary flow successively to other gaps in the order in which they were increasingly greater at the start of electrochemical machining.

The elements 18 and 20 of the present invention, in one simplified form, are shown in the expanded view of FIG. 1 with relationship to a tool 12 and a workpiece 10. If it is desired to produce from metallic workpiece 10, the shape shown in phantom in FIG. 1, a tool shaped similarly to tool 12 of FIG. 1 can be used in an electrochemical material removal process. In most cases the shape is the same though dimensioned larger to provide the desired gap.

In such a process, the workpiece 10 would be made an anode and the tool 12 would be made a cathode while electrolyte, represented by flow arrow 16, is passed between the tool and the workpiece. As the tool and workpiece are made to approach one another, for example, by moving the tool 12 along the line shown by arrow 14 toward the workpiece, varying amounts of electrochemical material removal action will occur at the workpiece surface depending on the distances between the workpiece and the various tool work surfaces such as 12a, 12b and 12c of tool 12. If a portion of the tool approaches too closely to the workpiece, the electric potential impressed between the tool and the workpiece will short circuit locally directly to the workpiece rather than being carried in the form of ions through the electrolyte. Thus general electrochemical material removal action will cease.

In FIG. 1, as the gap between tool 12 and workpiece 10 is decreased at the start of the operation, surface 12a of the tool will be nearest to the workpiece while tool surfaces 12b and 12c remain respectively at increasingly greater distances. Therefore as tool surface 12a approaches the workpiece 10, the electrolyte which is flowing in the direction of arrow 16 between the workpiece and the tool meets a greater resistance to flow in that area than it does between surfaces 12b and the workpiece and 12c and the workpiece. Therefore, because it will seek the path of least resistance, the electrolyte will be directed away from the gap between surface 12a and the workpiece. Then electrolyte starvation, resulting in a short circuit, can occur between surface 12a of the tool and the workpiece. Furthermore, because electrochemical material removal processes can build up a slight sludge deposit on the working surfaces, the constriction to flow of electrolyte and the chance of short circuiting is further aggravated between tool surface 12a and the workpiece.

The present invention is represented, in one structural form, by weir means 18 in FIG. 1 and shutter means 20. Although the elements 18 and 20 in FIG. 1 are shown to be spaced relatively far from each other and from the tool-workpiece combination, it should be understood that such spacing is for the sake of ease of representation. In operation, such elements and the tool and workpiece are arranged to be very close together to direct electrolyte flow as described below. In a preferred arrangement, FIG. 1, weir means 18 is provided to be attached to and move with tool 12, as indicated by arrow 14. Shutter means 20, in FIG. 1, remains stationary in this particular form of the invention and is located as close to weir 18 as possible without interfering with the movement of the weir. However, it is to be understood that the shutter means 20 can be adapted to move in a plane substantially parallel to weir 18 to open or close passages through the weir and shutter in relation to a tool and workpiece.

Weir 18 includes a weir profile edge portion 22 related in shape to the exit profile of the tool as determined by the points at which the electrolyte exists from between the tool 12 and the workpiece 10. This profile is herein referred to as the exit tool profile portion.

During operation, the weir means of the present invention, as shown in FIG. 1, is attached to the tool 12 on the side of tool 12 at which the electrolyte exists from between the tool and the workpiece. Weir means 18 is made of an electrically non-conductive material or is electrically insulated from the tool or the workpiece.

The weir means 18 is aligned in connection with the tool 12 to provide an exit gap 24, shown in FIG. 2, through which electrolyte passes during electrochemical removal operation. With shutter means 20 located on the side of weir 18 opposite the tool 12, when the tool-weir combination is moved relative to the shutter as shown by arrow 14 in FIG. 3, a gap 24a is opened at the start of the electrochemical material removal process. The position of workpiece 10 is shown in FIG. 3 in relation to the weir and shutter. Thus the only path through which electrolyte can exit from between tool 12 and workpiece 10 is through gap portion 24a. The electrolyte is specifically directed, at this point in the operation, between the workpiece and surface 12a of the tool to particularly avoid electrolyte starvation and short circuiting at that critical area.

As the tool progressively removes material from the workpiece, it establishes its own gap as a result of tool feed rate and applied current and hence the shutter means can remain open unless it is desirable to program a reduced electrolyte flow as shown later in FIGS. 7–9. As shown in FIG. 4 at a later stage in the movement of the tool 12 and weir 18 in the direction shown by arrow 14, another electrolyte path 24b and part of 24d is opened to allow electrolyte to flow through gaps 24a, 24b and part of 24d. At the point in the process shown by FIG. 4, the workpiece surfaces opposite tool surfaces 12a, 12b and 12d are those at which principal electrochemical removal is occurring. However, tool surface 12c is still too far from the workpiece to remove material efficiently. Therefore the electrolyte still is directed away from surface 12c by the present invention.

Subsequently, as the tool and weir are moved in the direction of arrow 14 to bring the tool surface 12c closer to the workpiece, gap 24c will be opened to allow electrolyte to flow equally through all gaps between the tool and the workpiece. At this point in the process, work surfaces of the tool are in equal electrochemical material removal relationship with the workpiece. Now the relative movement between the tool and workpiece controls the flow of electrolyte over the working surfaces.

In some instances, it may be desirable to slow or inhibit the electrolyte flow at gaps between the tool and workpiece which have established their own electrolyte gap as a result of electrochemical material removal action. For example, in the manufacture of a turbine bucket, shown in FIG. 5 having an airfoil 25, a platform 27, a shank 29 and a dovetail 31, a tool similar to 26, shown in FIG. 6 with partially completed workpiece 33, can be used with a weir 28 and shutter 30 in FIGS. 7–9. During the progressive operations shown in FIGS. 7, 8 and 9, as the weir 28 and accompanying tool 26 are moved in the direction of arrow 32, gaps such as 34a, 34b and 34c are progressively opened to electrolytes flow. However, if it is desired to inhibit the flow of electrolyte through gap 34a during a subsequent part of the operation, shutter 30 can be provided with a portion 30a of suitable shape, which can be solid or can be slotted or perforated as shown by holes 36 in FIGS. 7–9 to inhibit the flow of electrolyte at that point in a manner which will not starve the electrolyte flow to the extent a short circuit results.

There are a variety of operating conditions under which the electrolyte flow control of the present invention can be used. The electrolyte and operating conditions will be selected for the particular workpiece material and configuration desired. In one example, a workpiece having a composition, by weight, of 19% Cr, 11% Co, 9.75% Mo, 3.15% Ti, 1.50% Al, 0.007% B with the balance Ni, and sometimes referred to as René 41 nickel base alloy, was electrochemically machined into a turbine blade according to the present invention. A nickel cathode-tool was used with an electrolyte consisting of, by weight, 20% NaCl, 0.5% citric acid, with the balance water. The electrolyte was introduced at room temperature and at a pressure of 150 p.s.i. and a flow rate of 27 gallons per minute across the face of the electrodes at a working gap of about 0.007 inch between the tool and workpiece. A current of 1500 amps was passed between the tool and workpiece at a voltage of about 15 volts. Under these conditions, it was possible to feed the tool toward the workpiece at a rate of about 1 inch per hour. The weir, which was attached to the tool, was a phenolic resin impregnated cloth. It had a weir profile edge portion shaped substantially the same as the exit tool profile portion. However the weir profile edge portion was dimensioned slightly larger to provide an opening of about ⅛" through which electrolyte could exit. The shutter, also made of the cloth impregnated plastic, was stationary.

Although the present invention has been described in connection with specific examples and embodiments, it will be understood by those skilled in the art that a variety of modifications and variations can be made without departing from the scope of the present invention.

What is claimed is:
1. Electrochemical machining apparatus for use in producing an article surface from an electrically conductive workpiece including a work surface, in combination:
   a cathode-tool having a three dimensional tool surface substantially different in surface contour from that of the work surface of the workpiece prior to electrochemical machining operation, the tool surface including at an edge an exit tool profile portion;
   a workpiece support means to position the work surface of the workpiece in juxtaposition with the tool surface to define an electrochemical machining gap;

means for moving the cathode-tool and the workpiece support means one toward the other to maintain the gap;

chamber means to provide an electrolyte enclosure for filling the gap and for directing electrolyte through the gap toward the exit tool profile portion;

an electrolyte source;

means connecting the chamber means with the electrolyte source to circulate electrolyte through the chamber means;

weir means including a weir profile edge portion relating in shape to the exit tool profile portion;

means for supporting the weir means to position the weir profile edge portion in spaced apart relationship with and substantially opposite the exit tool profile portion of the cathode-tool during electrochemical machining operation to maintain an exit gap between the exit tool profile portion and the weir profile edge portion through which electrolyte is discharged from the electrochemical machining gap;

shutter means having a shutter edge portion forming one boundary of an opening in the shutter means;

means for supporting the shutter means adjacent the weir means and for positioning the shutter edge portion with respect to the exit gap formed by the exit tool profile portion and the weir profile edge portion, during relative movement between the exit gap and the shutter edge portion, to control flow of electrolyte from the exit gap as a function of the article surface to be produced;

an electrical power source of predominantly direct current; and electrical conductor means connected between the cathode-tool and the workpiece whereby the cathode-tool is predominantly negative and the workpiece is predominantly positive during electrochemical machining.

2. The apparatus of claim 1 in which the weir means is attached to the cathode-tool for movement therewith.

References Cited by the Examiner
UNITED STATES PATENTS

| | | | |
|---|---|---|---|
| 2,745,805 | 5/1956 | Jones | 204—279 |
| 3,095,364 | 6/1963 | Faust et al. | 204—143 |

JOHN H. MACK, *Primary Examiner.*

HOWARD S. WILLIAMS, *Examiner.*

R. MIHALEK, *Assistant Examiner.*